United States Patent

[11] 3,607,189

| [72] | Inventor | William Manring |
| | | Hamilton, Ohio |
| [21] | Appl. No. | 786,353 |
| [22] | Filed | Dec. 23, 1968 |
| [45] | Patented | Sept. 21, 1971 |
| [73] | Assignee | FMC Corporation |
| | | New York, N.Y. |

[54] MELTING PARTICULATE GLASS BATCH
5 Claims, No Drawings

| [52] | U.S. Cl. | 65/134, 65/135, 65/335, 106/47 |
| [51] | Int. Cl. | C03b 5/16 |
| [50] | Field of Search | 65/134, 335, 135; 106/47 |

[56] References Cited
UNITED STATES PATENTS

| 1,759,228 | 5/1930 | Drake | 65/335 X |
| 1,970,112 | 8/1934 | Wadman | 65/335 X |
| 2,114,545 | 4/1938 | Slayter | 65/335 X |
| 3,294,505 | 12/1966 | Garrison | 65/335 X |
| 3,443,921 | 5/1969 | Boivent | 65/134 |

Primary Examiner—Frank W. Miga
Attorneys—Eugene G. Seems, Frank Ianno and Milton Zucker

ABSTRACT: An improved process for producing glass designed for television tubes is described comprising adding either barium carbonate or strontium carbonate to a glass batch in the form of hard, prefused particles made by fusing a mixture of said barium carbonate (or strontium carbonate) with at least 20 percent by weight of sodium carbonate and/or potassium carbonate.

3,607,189

1

MELTING PARTICULATE GLASS BATCH

BACKGROUND OF THE INVENTION

A. Field of the Invention

This invention relates to the production of glass, and more particularly to the makeup of a homogeneous glass batch which, on being charged to a glass furnace, yields a glass substantially free of imperfections.

B. Description of the Prior Art

In the production of glass intended for use in the manufacture of television picture tubes, the glass composition differs considerably from that utilized in ordinary container or window glass because of the different and critical requirements which such glass must meet. For example, the glass utilized in the manufacture of television picture tubes must have an extremely high electrical resistance because of the high voltages utilized in operation of the tube. This requirement is even more pronounced in the case of color television tubes where even more severe conditions exist than do in conventional monochromatic tubes. Further, the glass faceplate of the tube must be optically perfect to prevent distortion of the picture, and it must be extremely strong because of the high vacuum used in these tubes. Another requirement is that the composition of the glass must be such that it will absorb X-rays generated within the tube during its operation. To meet this latter requirement, it is common to utilize lead oxide, barium oxide or strontium oxide in the glass formulation.

A most serious problem that has arisen in the production of glass for television tubes is the appearance of optical streaks or striae having different refractive indexes from the remaining glass. These imperfections (termed "cords" in the trade) have, upon analysis, been found to be due to abnormally high, local concentrations of a component, such as barium silicate, formed in the glass-making process from barium introduced as barium carbonate. These "cords" have, in turn, been traced to the segregation of one of the corresponding additives, i.e., barium carbonate, in the glass glass batch prior to charging the batch into the glass furnace. In essence, if any components of the glass batch demix and segregate because of particle size differences prior to being charged into the glass furnace, homogeneity in the final glass melt is difficult to achieve because of the high viscosity of the melt.

Normally, glass-grade barium carbonate is an extremely fine, precipitated crystal of about 1 micron in size. Attempts have been made to make, by high temperature agglomeration, a more granular product which is compatible with the sizing distribution of the other raw materials of the glass batch. However, these prior agglomerates apparently lack the desired physical strength. On being mixed and handled in a glass batch they break down into the original, fine particles of barium carbonate. These fine particles, in turn, segregate from the coarser components of the glass batch, resulting in "cords" being formed in the final, annealed glass.

An ancillary problem which has arisen from the segregation of the barium carbonate (or strontium carbonate) in the glass batch is that these additives require longer periods to dissolve in the melt. The reaction between silica and barium carbonate (or strontium carbonate) in the absence of sodium carbonate (or potassium carbonate) is extremely slow and proceeds only at very high temperatures, i.e., over 1,000° C. By contrast, when barium carbonate is in contact with both sodium carbonate and silica, the barium carbonate-silica reaction takes place at much lower temperatures and more rapidly.

OBJECTS OF THE INVENTION

It is an object of the invention to prevent the formation of "cords" in glass intended for use in the manufacture of television picture tubes.

It is a further object of the present invention to prevent the segregation of barium or strontium compounds in a glass batch which is fed to a glass furnace.

It is still a further object of the present invention to make up a glass batch wherein the reaction between the barium carbonate (or strontium carbonate) and silica takes place rapidly and at relatively low temperatures.

These and other objects will be apparent from the following disclosure.

SUMMARY OF THE INVENTION

I have now found an improved method for adding either barium carbonate or strontium carbonate to a glass batch which is fed to a glass furnace, without encountering the above difficulties. This is achieved by adding the barium carbonate or strontium carbonate in the form of a fused mixture of barium carbonate (or strontium carbonate) and sodium carbonate and/or potassium carbonate; the fused mixture is formed by heating and melting a mixture of barium carbonate (or strontium carbonate) with sufficient amounts of sodium carbonate and/or potassium carbonate to constitute at least 20 percent by weight of the resulting melt, cooling the fused mixture to obtain a solid, and sizing the solidified mixture to separate solid particles having a size of about −30 to about +140 Tyler Mesh.

DESCRIPTION OF THE INVENTION AND THE PREFERRED EMBODIMENTS

In carrying out the present invention all the ingredients of a typical glass for making television picture tubes are weighed out in order to yield a glass having the following composition (expressed as the metal oxide):

| | |
|---|---|
| $SiO_2$ | 66.0% |
| $Al_2O_3$ | 3.0 |
| $K_2O$ | 7.0 |
| $Na_2O$ | 7.0 |
| BaO | 13.0 |
| $F_2$ | 1.0 |
| $LiO_2$ | 0.5 |
| PbO | 2.0 |
| Other | 0.5 |
| | 100.0% |

In addition to the ingredients set forth above, glass compositions of this type sometimes contain cerium in an amount to yield about 1 percent $CeO_2$ to prevent discoloration of the glass by electron bombardment. The components of the batch, except for the barium carbonate (or strontium carbonate), sodium carbonate and, if present, potassium carbonate, are admixed.

The barium carbonate (or strontium carbonate) is intimately mixed with the sodium carbonate and/or potassium carbonate and heated to melting. In general, the amount of sodium carbonate and/or potassium carbonate which must be present is such that the fused mixtures contain at least about 20 percent by weight of either sodium carbonate, potassium carbonate or mixtures thereof. The preferred mixture is one containing about 50 percent by weight of these alkali metal salts. Higher amounts of the alkali metal carbonates, up to about 99 percent by weight can be employed in the makeup of these mixtures. However, the melting point of these mixtures, containing proportionally larger amounts of the alkali metal carbonates, is higher than the preferred mixtures in which the proportion is about 50 percent by weight each of sodium carbonate (or potassium carbonate) and barium carbonate (or strontium carbonate). Since lower melting temperatures are more desirable, the preferred mixtures are those that have the lower melting points.

Surprisingly, these mixtures melt at temperatures substantially below the melting point of either of the components. For example, in a mixture containing 48.2 weight percent sodium carbonate, with the remainder being barium carbonate, a eutectic melting at a temperature of about 680° C. is obtained. This is materially below the melting point of sodium carbonate (about 857° L C.) and substantially below the point at which barium carbonate is converted into a liquid form, i.e., about 1300° C. The resulting melt is then rapidly cooled to give a solid mass of the mixture, and this mass is divided into hard particles of −30 to +140 mesh in size. Another technique for forming these particles is to spray the molten liquid through a spray drier system and obtain spray-dried beads of the fused mixture. The parameters of the spray-drying operation can be controlled to obtain particles of the desired size. Still another technique which may be employed is to dry the fused mixture into flakes on a water-cooled drum and then crush the flakes to the desired particle size.

In general, the size of the fused particles is controlled to match as closely as possible the size of the other components of the glass batch. Normally, the particles will be within the range of −30 to +140 mesh and should have an average mesh size of between 60 and 70 mesh. It should be noted that in the preparation of this prefused mixture, large quantities of soda ash and potassium values are normally included in the fused mixture in order to decrease the number of components which have to be blended in the makeup of the glass batch. Since the major portion of the glass batch mixture is composed of sand, the prefused mixture is normally produced in a size which closely matches the size of the sand utilized in the glass batch. In this way, segregation of the fused mixture from the sand is minimized.

The particles produced by fusing the barium carbonate (or strontium carbonate) with either sodium carbonate and/or potassium carbonate are quite hard and are not as readily broken down into finer particles on being mixed or handled during the makeup of the glass batch, as are particles of barium carbonate or strontium carbonate alone. This is most important since breakdown of these particles results in fine grains of barium carbonate (or strontium carbonate) being formed, and such fine grains are likely to segregate from the batch and result in the formation of "cords" in the final glass product.

The fused mixture containing the barium (or strontium), sodium and/or potassium values is then added to the other components of the batch mixture to form a homogeneous blend. This blend is charged to the glass furnace and heated until melted at temperatures of from about 1310° C. to about 1590° C. The resulting melt is then cooled to form glass in a known manner.

In the present process an ancillary benefit is obtained in adding the barium or strontium carbonates in the form of prefused, particulate mixtures. The prefused mixtures of barium and/or strontium react at a more rapid rate with the silica than do either barium carbonate or strontium carbonate. This is due in part to the low melting eutectic which is formed by the combination of the barium carbonate (or strontium carbonate) with either the sodium or potassium carbonate. As the result of the low melting eutectic which is formed, the barium carbonate and/or strontium mixture melts at a low temperature, preferably on the order of about 700° C., and then rapidly wets the silica particles, thereby initiating more rapid reaction between the silica and the carbonate. In the absence of an intimate mixture of barium (or strontium) carbonate and soda ash or potassium carbonate, the barium (or strontium) carbonate does not melt at temperatures below 1000° C. and therefore does not wet the silica and react with it until substantially higher temperatures have been reached and then only at materially reduced rates.

The present process also is advantageous in that it reduces the number of components which must be blended in the makeup of the glass batch. More specifically, the soda ash and barium carbonate (or strontium carbonate) can be combined into a single prefused entity, thereby assuring homogeneity of the glass batch. Further, if desired, potassium values (either the entire potassium values or a part thereof) can be incorporated in the prefused mixture in order to further reduce the number of components which must be blended in the makeup of the glass batch.

The following examples are given to illustrate the invention and are not deemed to be limiting thereof.

EXAMPLE 1

Samples of soda ash (sodium carbonate) and glass grade barium carbonate were admixed and melted on the hot stage of a microscope such as described in U.S. Pat. Ser. No. 3,218,925 to form batches weighing about 0.01 gram. The batches contained an $Na_2O:BaO$ weight percent ratio of 6.09:13.0 (38.4 weight percent $Na_2CO_3$). This corresponds to the ratio of $Na_2O$ to $BaO$ present in conventional television tube glass, after providing for the presence of $Na_2O$ from added feldspar. These sodium carbonate-barium carbonate mixtures were found to melt at about 710° C. and to form a very fluid liquid which, on cooling, crystallized into hard, needlelike crystal agglomerates. A portion of this crystallized material was melted in the presence of sand on the hot stage of the microscope described above. The sodium carbonate-barium carbonate mix melted at 710° C., and the resulting liquid wet and reacted with the sand. As the temperature was increased, the sand reacted completely and vigorously with the sodium carbonate-barium carbonate liquid melt.

EXAMPLE 2

The procedure of example 1 was repeated except that the batches contained a three-component mix. The mixture contained, expressed in percent by weight: 28.8 percent $Na_2CO_3$, 46.2 percent $BaCO_3$ and 25.0 percent $K_2CO_3$. In this case the melting point of this three-component mixture was 665° C. On heating the cooled, three-component, crystallized mixture with sand, the mixture melted at its eutectic melting point (665° C.) and readily wet the sand. As the temperature was increased over the eutectic melting point of the three-component mix, the melt readily reacted with the sand (silica) in the same manner as the two-component mix of example 1.

EXAMPLE 3

The procedure of example 1 was repeated except that equivalent amounts of strontium carbonate were employed in place of barium carbonate. This mixture also formed a eutectic mixture and readily wet silica and reacted with silica at the lower temperatures of the eutectic mixture in the same way as the mixture of example 1.

EXAMPLE 4

In this example two 140 gram, prefused samples were prepared as follows:

Mix I—a mixture of sodium carbonate and barium carbonate was made up so that it contained an $Na_2O:BaO$ weight ratio of 6.09:12.94. This mixture contained 38.7 weight percent of sodium carbonate with the remainder being barium carbonate. This mixture was heated in a porcelain crucible at 815° C. for 30 minutes until the mixture had melted completely. Thereafter, the melt was quenched by pouring it onto a cold, ceramic plate; the resulting quenched particles were then crushed by hand in a modified mortar and pestle to yield particles having a size of −30 mesh. The average sizes of the particles were between 50 and 60 mesh.

Mix II—this mixture was obtained by mixing together sodium carbonate, barium carbonate and potassium carbonate to yield weight percents, respectively, of 28.8 percent, 45.5 percent and 25.7 percent. The resulting mixture contained an $Na_2O:BaO:K_{cq}^{\, o}$ ratio of 6.09:12.94:6.31. These components were mixed together to form a total of 140 grams of material and were heated in a porcelain crucible at 815° C. for 30 minutes. The melt was quenched by being poured onto a cold, ceramic plate; the resulting quenched particles were then crushed by hand in a modified mortar and pestle to −30 mesh. The average particle size of the quenched particles was between 60 and 70 mesh.

The prefused mixes, Mix I and Mix II, were then used in the preparation of two glass melts. The composition of the glass batches, expressed as parts by weight, is set forth in table I.

TABLE I

Batch Compositions of Barium Glasses

|  | Prior Art Batch | Batch A | Batch B |
| --- | --- | --- | --- |
| Sand | 1950 | 1950 | 1950 |
| Feldspar | 569.74 | 569.74 | 569.74 |
| $BaCO_3$ | 570.75 | | |
| Soda Ash | 356.84 | | |
| $K_2CO_3$ | 308.51 | 308.51 | |
| Mix I | | 927.59 | |
| Mix II | | | 1236.02 |
| PbO | 72.12 | 72.12 | 72.12 |
| Salt Cake | 10 | 10 | 10 |
| $Na_2SiF_6$ | 58.63 | 58.63 | 58.63 |

Mix I was used in the preparation of glass sample A, while Mix II was used in the preparation of glass sample B. For comparison, a prior art melt was made up distributed which soda ash, barium carbonate and potassium carbonate were used in place of the prefused mixes. The glass melts that were made up each contained a total of about 40 grams of the glass batch, and the batch was heated in porcelain crucibles at 1450° C. for 1 hour. The crucibles were then transferred immediately to an annealing oven at 680° C. and cooled slowly to room temperature.

The interiors of each of the cooled, annealed glasses were then examined. Batches A and B were uniform and homogeneous. The prior art batch had tiny, undissolved particles of the glass batch distributed throughout the glass sample. This indicated that the ingredients of the prior art batch did not react, melt and disperse uniformly within contained the heating and melting period as did the samples which contained the prefused Mix I or Mix II.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the preparation of a particulate glass batch for melting in a glass furnace, said batch including as main raw materials silica, soda ash, potassium carbonate and a member selected from the group consisting of barium carbonate and strontium carbonate, the process of reducing segregation of the components in the final glass comprising the steps of:
   a. mixing a member selected from the group consisting of barium carbonate and strontium carbonate with sufficient amounts of a member selected from the group consisting of soda ash and potassium carbonate to constitute at least 20 percent of the resulting mixture, and heating said mixture until it has melted and fused,
   b. cooling the fused mixture of (a) and dividing it into hard, fused particles having a size of from −3 to +140 mesh,
   c. mixing said hard, fused particles with the remaining ingredients of said main raw materials to form a discrete, particulate glass batch, and
   d. heating said discrete, particulate glass batch in a glass furnace to temperatures of from 1310° C. to about 1590° C. to form a homogeneous glass.

2. Process of and sodium 1 in which said fused particles contain barium carbonate and sodium carbonate.

3. Process of claim 2 wherein said barium carbonate and said sodium carbonate are present in a weight ratio of about 1:1.

4. Process of claim 1 wherein said fused particles contain strontium carbonate and sodium carbonate.

5. Process of claim 4 wherein said strontium carbonate and said sodium carbonate are in a weight ratio of about 1:1.

UNITED STATES PATENT OFFICE
CERTIFICATE OF CORRECTION

Patent No. 3,607,189     Dated 9/21/71

Inventor(s) William Manring

It is certified that error appears in the above-identified patent and that said Letters Patent are hereby corrected as shown below:

Column 1, line 38 "glass" second occurrence should be omitted.

Column 4, line 8 "Ser. No." should be omitted.

Column 4, line 68 "Kcq°" should read --$K_2O$--.

Column 5, line 25 "distributed" should read --in--.

Column 5, line 38 "contained" should be omitted.

Column 6, line 32 "and sodium" should read --claim--.

Signed and sealed this 10th day of September 1974.

(SEAL)
Attest:

McCOY M. GIBSON, JR.
Attesting Officer

C. MARSHALL DANN
Commissioner of Patents